(12) United States Patent
Satapati et al.

(10) Patent No.: US 7,356,045 B2
(45) Date of Patent: Apr. 8, 2008

(54) SHARED PORT ADDRESS TRANSLATION ON A ROUTER BEHAVING AS NAT & NAT-PT GATEWAY

(75) Inventors: Suresh K. Satapati, Santa Clara, CA (US); Senthil M. Sivakumar, Sunnyvale, CA (US); Jieping Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1192 days.

(21) Appl. No.: 10/278,327

(22) Filed: Oct. 22, 2002

(65) Prior Publication Data

US 2004/0076180 A1 Apr. 22, 2004

(51) Int. Cl.
*H04J 3/16* (2006.01)
(52) U.S. Cl. .................... 370/466; 370/395.5
(58) Field of Classification Search ............... 370/466, 370/395.5, 395.54
See application file for complete search history.

(56) References Cited

U.S. PATENT DOCUMENTS

| | | | | |
|---|---|---|---|---|
| 7,047,314 | B2* | 5/2006 | Sato et al. | 709/238 |
| 2002/0154624 | A1* | 10/2002 | Oishi et al. | 370/350 |
| 2003/0110292 | A1* | 6/2003 | Takeda et al. | 709/245 |
| 2003/0233576 | A1* | 12/2003 | Maufer et al. | 713/201 |
| 2004/0001509 | A1* | 1/2004 | Zhang et al. | 370/466 |

FOREIGN PATENT DOCUMENTS

WO 02/073933 A1 9/2002

OTHER PUBLICATIONS

G. Tsirtsis BT, RFC 2766—Network Address Translation—Protocol Translation (NAT-PT), Feb. 2000, Copyright (C) The Internet Society (2000). www.ieft.org/rfc/rfc2766.txt?number-2766.□□.*
E. Nordmark, "Stateless IP/ICMP Translation Algorithm (SIIT)", RFC 2765, Online, Feb. 2000, 23 pages.
G. Tsirtsis, "Network Address Translation—Protocol Translation (NAT-PT)", RFC 2766, Online, Feb. 2000, 15 pages.
International Search Report, dated Mar. 25, 2004.
European Patent Office Examination Report dated Aug. 4, 2005 for corresponding European Patent Application No. 03774868.8, 6 pages.
Chinese Office Action dated Dec. 8, 2006 for related Chinese Application No. 200380101901.X.

* cited by examiner

*Primary Examiner*—Chi Pham
*Assistant Examiner*—Phuc Tran
(74) *Attorney, Agent, or Firm*—Beyer Weaver LLP

(57) ABSTRACT

A method for transparently sharing at least one IPv4 address among a plurality of hosts wherein at least a first host of the plurality of hosts uses the IPv4 protocol and wherein at least a second host of the plurality of hosts uses an IPv6 protocol is provided. A first data having a first source address and a first destination address is received. A network address translation with port address translation is performed, if the first data is in an IPv4 protocol. A network address translation protocol translation with port address translation is performed, if the first data is in an IPv6 protocol.

24 Claims, 5 Drawing Sheets

SHARED PORT ADDRESS TRANSLATION ON A ROUTER BEHAVING AS NAT & NAT-PT GATEWAY

BACKGROUND OF THE INVENTION

The present invention relates to methods and apparatus for processing data within a computer network. More specifically, this invention relates to performing network address translation on data.

In a network, devices on the network are provided network addresses, which are used to identify the different devices, when devices communicate between each other. IP protocol version 4 (IPv4) is a protocol used to provide addresses for public and private networks. A private network, such as an enterprise system, may be connected to a public network, such as the Internet. Such private networks may have more devices than available Internet IPv4 addresses allocated to the private network. In such a situation, a network address translator (NAT) may be connected between the private network and the Internet. The NAT may dynamically assign IPv4 addresses, so that the number of devices using the Internet at one time is limited to the available number of IPv4 addresses allocated to the private network. In the alternative, the NAT may use port address translation, where port numbers are used to further identify different devices with the same address.

IPv4 uses a 32-bit address. Even with these various multiplexing methods to allow multiple devices for each Internet IPv4 address, the number of devices that are desired to be connected to the Internet will exceed the limits of a 32-bit address. IPv6 is a protocol that is designed to replace IPv4. IPv6 provides for a 128-bit address to overcome address depletion and other problems caused by IPv4. Because a large number of devices and routers using IPv4 are in existence, IPv6 should replace IPv4 gradually, instead of instantaneously. As a result, networks using IPv6 need to be able to communicate with networks using IPv4 for a long period of time.

FIG. 1 is a schematic illustration of a system 100 that allows a network address translator (NAT) 106 to provide network address translations between a private IPv4 network with a plurality of IPv4 users 101, 102, 103 and a public network 104, such as an Internet, which is connected to a plurality of web servers 105, using the IPv4 protocol. The NAT 106 is able to provide a plurality of users Internet access, using a small number of IPv4 addresses. In this example, a single IPv4 address of 128.1.1.1 is assigned to the NAT 106. The NAT 106 may assign the plurality of users 101, 102, 103 private network addresses. For example, a user A 101 may be assigned a private network address of 10.1.1.1, a user B 102 may be assigned a private network address of 10.1.1.2, and a user C 103 may be assigned a private network address of 10.1.1.3. In this example, the web server 105 has a public address of 130.1.1.10. In this example, since the NAT 106 has a single Internet public address, the NAT 106 uses port address translation (PAT) to multiplex the single address by port number. In IPv4, the port number is 16 bits, providing 65,536 port numbers. Generally, port numbers 0-1024 are reserved for defined standard Internet uses. Therefore, the NAT 106 may use user definable ports 1025-65,535 for port address translation.

If user A 101 sends a packet to the web server 105, the packet sent from user A 101 to the NAT 106 may have the following protocol, source address, source port, destination address, and destination port numbers.

| Protocol | SA | SP | DA | DP |
| --- | --- | --- | --- | --- |
| TCP | 10.1.1.1 | 10,000 | 130.1.1.10 | 80 |

The NAT 106 uses a lookup table such as Table 1 to translate the packet source and destination address and ports.

TABLE 1

| | Private | | | | Public | | | |
| --- | --- | --- | --- | --- | --- | --- | --- | --- |
| Protocol | SA | SP | DA | DP | SA | SP | DA | DP |
| TCP | 10.1.1.1 | 10,000 | 130.1.1.10 | 80 | 128.1.1.1 | 10,000 | 130.1.1.10 | 80 |

As a result, the packet's destination and source address and ports are translated to:

| SA | SP | DA | DP |
| --- | --- | --- | --- |
| 128.1.1.1 | 10,000 | 130.1.1.10 | 80 |

Then the packet is sent from the NAT 106 to the web server 105 at the destination address.

The web server 105 may then send a packet back to user A 101 in reply. The packet sent from the web server 105 to the NAT 106 may have address and port designations as follows:

| Protocol | SA | SP | DA | DP |
| --- | --- | --- | --- | --- |
| TCP | 130.1.1.10 | 80 | 128.1.1.1 | 10,000 |

Using Table 1, the NAT 106 translates the destination and source address and port of the packet to:

| SA | SP | DA | DP |
| --- | --- | --- | --- |
| 130.1.1.10 | 80 | 10.1.1.1 | 10,000 |

FIG. 2 is a schematic illustration of a system 200 that allows a network address translator-protocol translator (NAT-PT) 206 to provide network address and protocol translations between an IPv6 network with a plurality of IPv6 users 201, 202, 203 and a public network 204, such as an Internet, which is connected to a plurality of web servers 205, using the IPv4 protocol. The NAT-PT 206 is able to provide a protocol translation to a plurality of IPv6 users, using a small number of IPv4 addresses. In this example, a single IPv4 address of 128.1.1.1 is assigned to the NAT-PT 206 host. The plurality of users 201, 202, 203 may be assigned public IPv6 addresses. For example, a user A 201 may be assigned an IPv6 network address of 3000::1, a user B 202 may be assigned an IPv6 network address of 3000::2, and a user C 203 may be assigned an IPv6 network address of 3000::3. In this example, the web server 205 has a public IPv4 address of 130.1.1.10. In this example, since the NAT-PT 206 has a single Internet public address, the NAT-PT 206 uses port address translation (PAT) to multiplex the single address by port number.

If user A 201 sends an IPv6 packet to the web server 205, the packet sent from user A 201 to the NAT-PT 206 may have the following protocol, source address, source port, destination address, and destination port numbers:

| Protocol | SA | SP | DA | DP |
|---|---|---|---|---|
| TCP | 3000::1 | 20,000 | 5000::10 | 80 |

Although the web server 205 has an IPv4 address of 130.1.1.10, the NAT-PT 206 assigns an IPv6 address of 5000::10 to it, so that user A 201 may address the web server 205 in an IPv6 format. This IPv6 address assignment to the web server could be due to prior configuration on the NAT-PT device, statistically or through a dynamic binding.

The NAT-PT 206 uses a lookup table such as Table 2 to translate the packet source and destination address and ports.

TABLE 2

| | Protocol | SA | SP | DA | DP |
|---|---|---|---|---|---|
| IPv6 | TCP | 3000::1 | 20,000 | 5000::10 | 80 |
| IPv4 | TCP | 128.1.1.1 | 20,000 | 130.1.1.10 | 80 |

As a result, the packet's destination and source address and ports are translated to:

| SA | SP | DA | DP |
|---|---|---|---|
| 128.1.1.1 | 20,000 | 130.1.1.10 | 80 |

Then the IPv4 packet is sent from the NAT-PT 206 to the web server 205 at the destination address.

The web server 205 may then send a packet back to user A 201 in reply. The IPv4 packet sent from the web server 205 to the NAT-PT 206 may have protocol, address and port designations as follows:

| Protocol | SA | SP | DA | DP |
|---|---|---|---|---|
| TCP | 130.1.1.10 | 80 | 128.1.1.1 | 10,000 |

Using Table 2, the NAT-PT 206 translates the destination and source address and port of the packet to:

| SA | SP | DA | DP |
|---|---|---|---|
| 5000::10 | 80 | 3000::1 | 20,000 |

Therefore, the prior art NAT with PAT is able to connect a plurality of IPv4 users to the Internet and the prior art NAT-PT with PAT is able to connect a plurality of IPv6 users to IPv4 web servers on the Internet.

BRIEF SUMMARY OF THE INVENTION

To achieve the foregoing, and in accordance with the purpose of the present invention, a method for transparently sharing at least one IPv4 address among a plurality of hosts wherein at least a first host of the plurality of hosts uses the IPv4 protocol and wherein at least a second host of the plurality of hosts uses an IPv6 protocol is provided. A first data having a first source address and a first destination address is received. A network address translation with port address translation is performed, if the first data is in an IPv4 protocol. A network address translation-protocol translation with port address translation is performed, if the first data is in an IPv6 protocol.

In another embodiment of the invention, the invention pertains to a computer system operable for transparently sharing at least one IPv4 address among a plurality of hosts wherein at least a first host of the plurality of hosts uses the IPv4 protocol and wherein at least a second host of the plurality of hosts uses an IPv6 protocol. The computer system includes one or more processors and one or more memory. At least one of the memory processors is adapted to provide at least some of the above-described method operations. In yet a further embodiment of the invention, the invention pertains to a computer program product for transparently sharing at least one IPv4 address among a plurality of hosts wherein at least a first host of the plurality of hosts uses the IPv4 protocol and wherein at least a second host of the plurality of hosts uses an IPv6 protocol. The computer program product has at least one computer readable medium and computer program instructions stored within at least one of the computer readable product configured to perform at least some of the described method operations. In yet another embodiment, the invention pertains to an apparatus that includes one or more means for transparently sharing at least one IPv4 address among a plurality of hosts wherein at least a first host of the plurality of hosts uses the IPv4 protocol and wherein at least a second host of the plurality of hosts uses an IPv6 protocol.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

It is desirable to have a combination NAT and NAT-PT with PAT that is able to connect a combination of both IPv4 and IPv6 users to the Internet.

Figure 1:
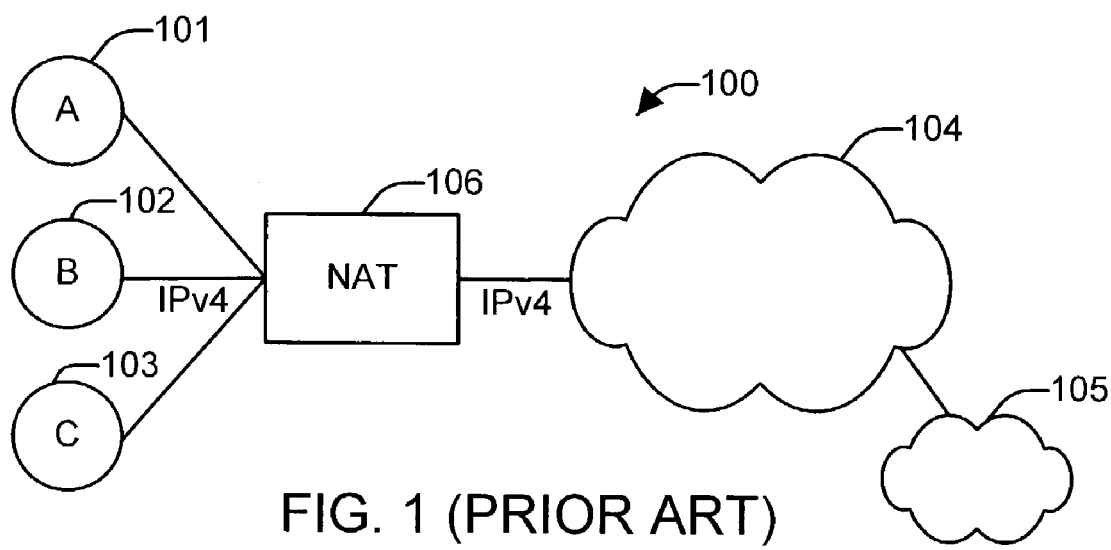
FIG. 1 is a schematic illustration of a system that allows a network address translator (NAT) to provide network address translations between a private IPv4 network with a plurality of IPv4 users and a public network such as an Internet in the prior art.
Figure 2:
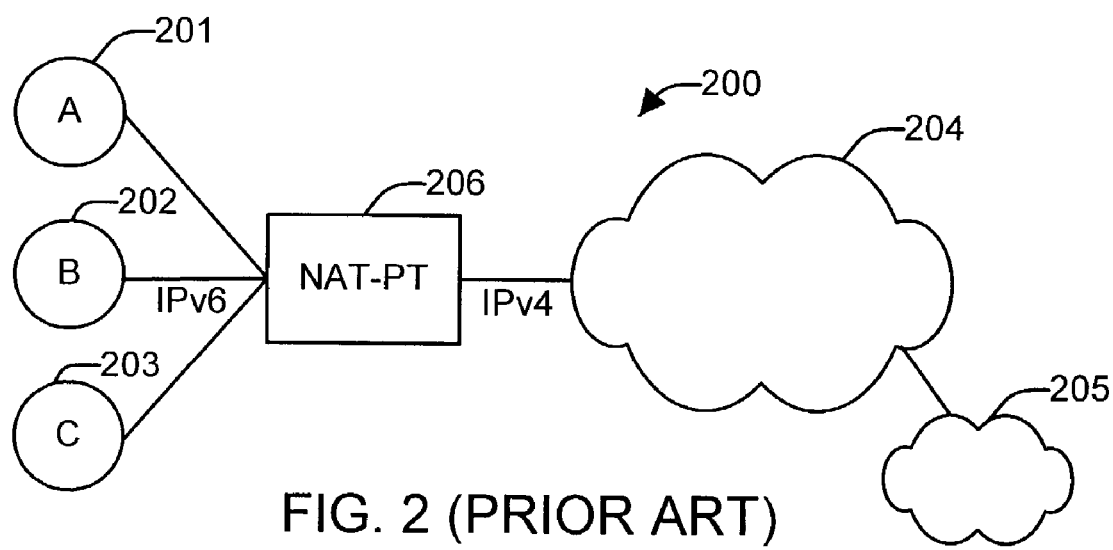
FIG. 2 is a schematic illustration of a system that allows a network address translator-protocol translator (NAT-PT) to provide network address translations between an IPv6 network with a plurality of IPv6 users and a public IPv4 network.
Figure 3:
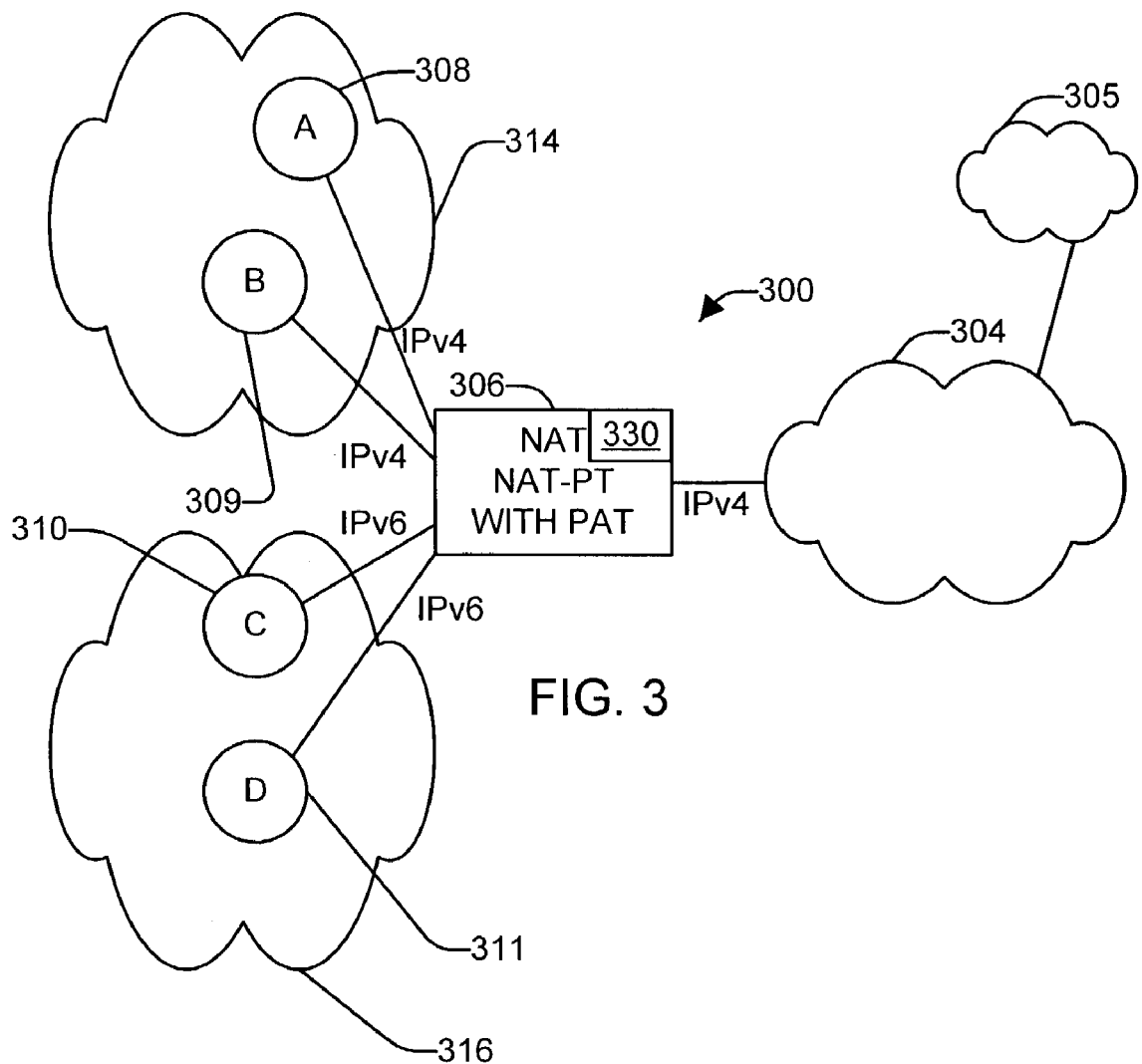
FIG. 3 is a schematic illustration of a system that allows at least a first device and second device of a first protocol, such as IPv4, and at least a third device and a fourth device of a second protocol, such as IPv6, to communicate with devices of the first protocol, through a router behaving as a gateway.

To facilitate understanding, FIG. 3 is a schematic illustration of a system 300 that allows a first device 308 and second device 309 of a first protocol, such as IPv4, and a third device 310 and a fourth device 311 of a second protocol, such as IPv6, to communicate with devices of the first protocol, through a Network Address Translation and Network Address Translation-Protocol Translation with Port Address Translation (NAT NAT-PT with PAT) device or NAT-PAT NAT-PT-PAT device, which in this embodiment is a router 306 behaving as a gateway. In the specification and claims, a router is defined as any device that performs routing/forwarding. The router may be an independent device or may be part of a larger device that does other functions. To facilitate understanding, devices such as the first device 308 and the second device 309, which use the IPv4 protocol, are drawn as part of an IPv4 network 314 and devices such as the third device 310 and the fourth device 311, which use the IPv6 protocol, are drawn as part of an IPv6 network 316. In the illustrated embodiment, although two devices are shown for each network having a different protocol, of course any suitable number of devices may be coupled with each network. Additionally, the devices coupled with router 306 may implement any suitable number and type of protocol, besides IPv4 and IPv6.

The router 306 may assign the first device 308 a private IPv4 address, such as 10.1.1.1 and the second device 309 a private IPv4 address, such as 10.1.1.2, since the first device 308 and the second device 309 are IPv4 devices. The router 306 may assign the third device 310 an IPv6 address, such as 3000::1 and the fourth device 311 an IPv6 address, such as 3000::2, since the third device 310 and the fourth device network consisting of devices that have been assigned unique IPv4 addresses.

In a preferred embodiment, the router 306 may have an NAT NAT-PT database 330, which is able to hold NAT entries and NAT-PT entries. The NAT NAT-PT database may comprise smaller databases or tables, such as a NAT table for the NAT entries that lists all network address translations for current connections from private IPv4 devices to public IPv4 devices and a NAT-PT table for NAT-PT entries that lists all network address translation-protocol translations for current connections from IPv6 devices to IPv4 devices. An example of a NAT table that lists all network address translations (NAT entries) for current connections from private IPv4 devices to public IPv4 devices is shown in Table 3.

TABLE 3

| | Private | | | | Public | | | |
|---|---|---|---|---|---|---|---|---|
| Protocol | SA | SP | DA | DP | SA | SP | DA | DP |
| TCP | 10.1.1.1 | 10,000 | 130.1.1.20 | 80 | 128.1.1.1 | 10,000 | 130.1.1.20 | 80 |

Table 3 shows an existing connection for the first device 308, which is assigned the single public IPv4 address 128.1.1.1, with a port designation of 10,000.

An example of a NAT-PT table that lists all network address translations-protocol translations (NAT-PT entries) for current connections from private IPv4 and IPv6 devices to public IPv4 devices is shown in Table 4.

TABLE 4

| | IPv6 | | | | IPv4 | | | |
|---|---|---|---|---|---|---|---|---|
| Protocol | SA | SP | DA | DP | SA | SP | DA | DP |
| TCP | 3000::1 | 10,001 | 5000::10 | 80 | 128.1.1.1 | 10,001 | 130.1.2.10 | 80 |

Table 4 shows an existing connection for the third device 310, which is assigned the single public IPv4 address 128.1.1.1 with a port designation of 10,001.

User A

Figure 4:
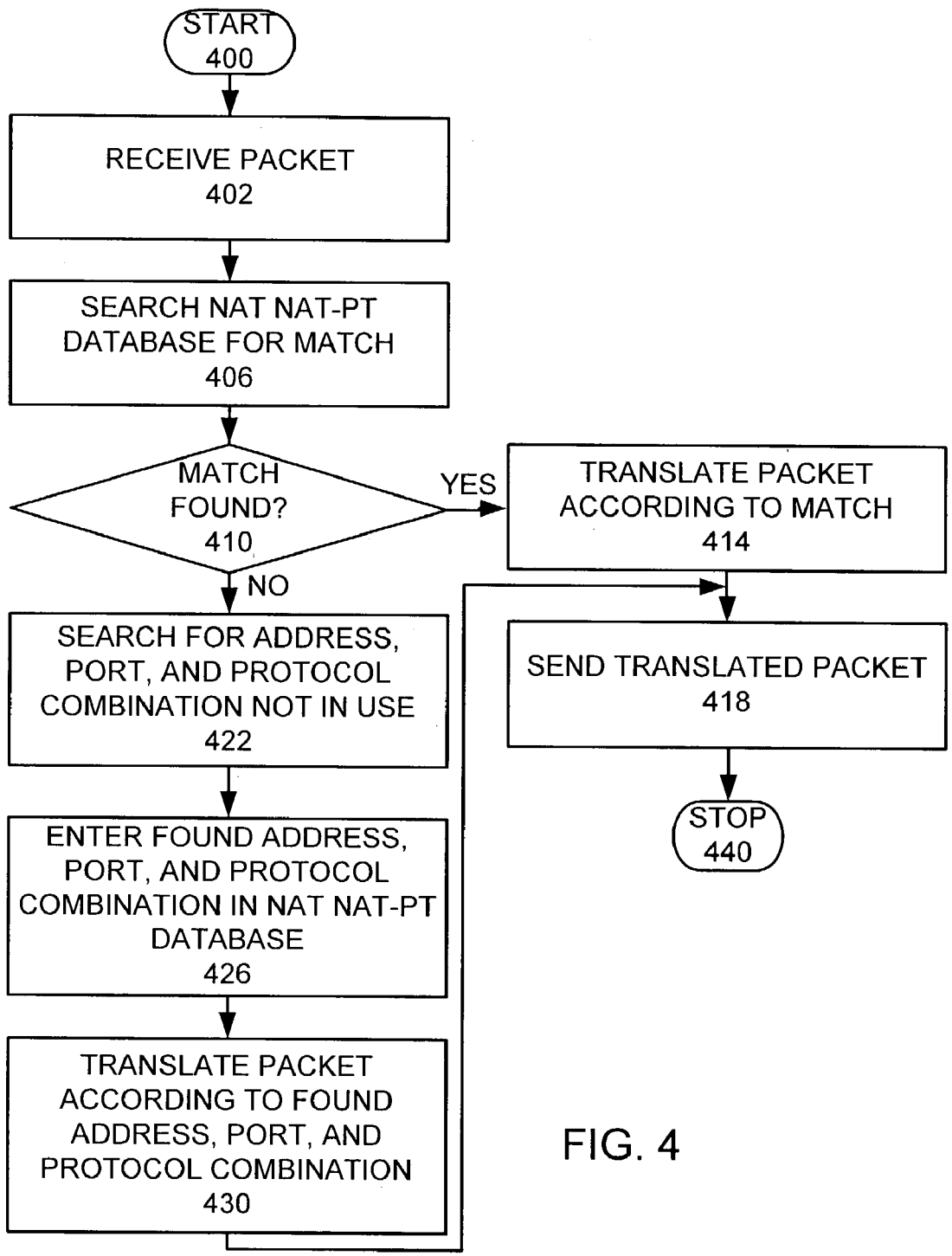
FIG. 4 is a high level flow chart of a process that may be used in an embodiment of the invention for sending packets to a public Internet.

FIG. 4 is a high level flow chart of a process that may be used by the router 306 in an embodiment of the invention for sending packets to a public Internet. In an example of the operation of the invention with an NAT NAT-PT database comprising Table 3 and Table 4, if user A, at the first device 308, sends a packet to the web server 305, the packet sent from the first device 308 to the router 306 may have the following protocol source address, source port, destination address, and destination port numbers:

| Protocol | SA | SP | DA | DP |
|---|---|---|---|---|
| TCP | 10.1.1.1 | 10,000 | 130.1.1.20 | 80 |

The router 306 receives the data packet (step 402). A search is made of the NAT NAT-PT database for a match (step 406). Since the packet is from the private network and is in IPv4 format, only the NAT entries in the NAT table, shown as Table 3, part of the NAT NAT-PT database, are searched. This is because such packets should only come from an IPv4 device, in this example. It is found that the NAT entry in the NAT table, shown as Table 3, matches the data packet (step 410). The packet is then translated (step 414) according to Table 3, so that the resulting packet has the protocol, source address, source port, destination address, and destination port of:

| Protocol | SA | SP | DA | DP |
|---|---|---|---|---|
| TCP | 128.1.1.1 | 10,000 | 130.1.1.20 | 80 |

Then the packet is sent from the router 306 to the web server 305 at the destination address (step 418).

Figure 5:
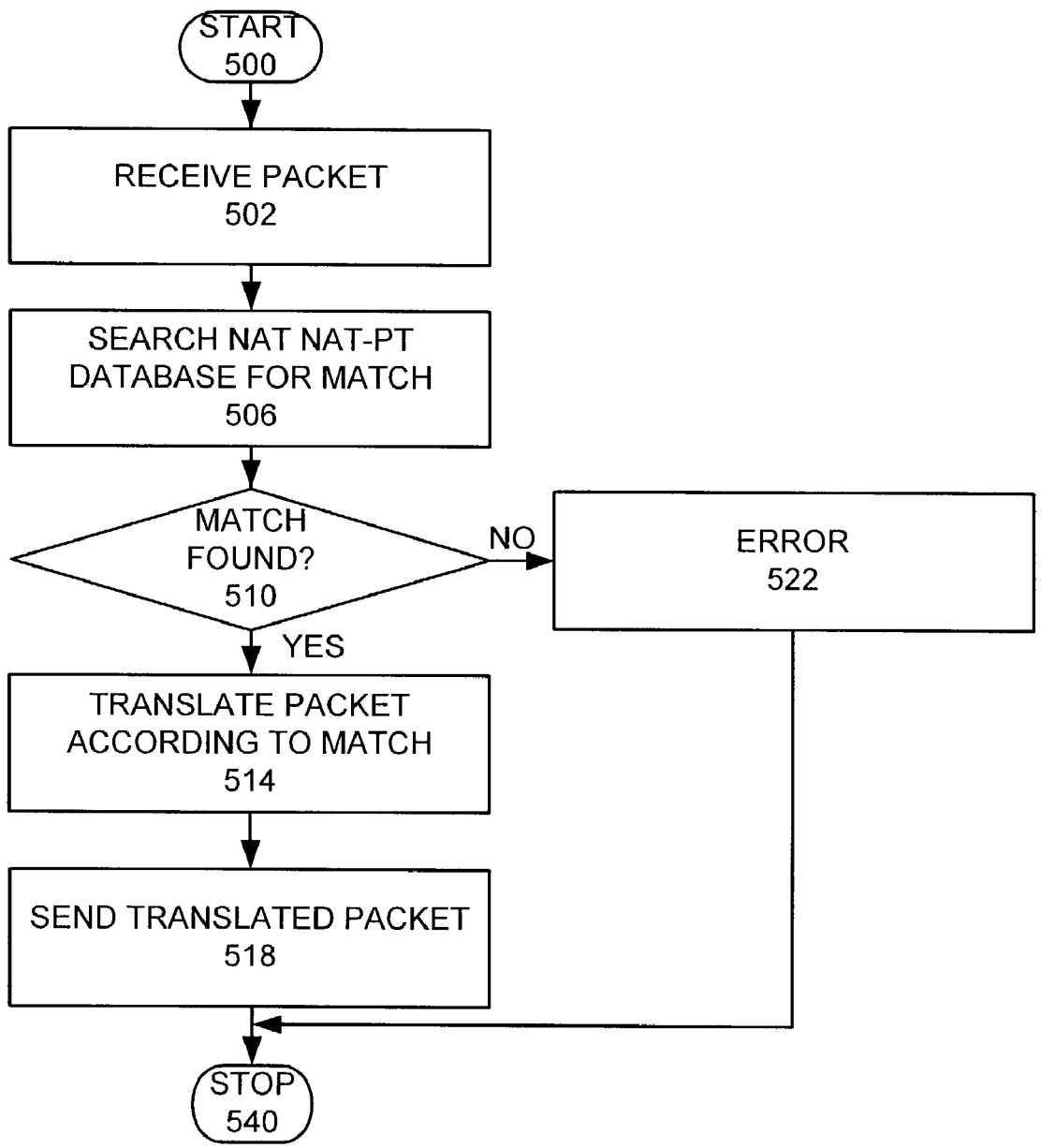
FIG. 5 is a high level flow chart of a process for receiving packets from the public Internet.

The web server 305 may then send a packet back to user A in reply. FIG. 5 is a high level flow chart of a process used by the router 306 for receiving packets from the public Internet. The packet is sent from the web server 305 to the router 306. The router 306 receives the packet (step 502). The packet may have protocol, address and port designations as follows:

| Protocol | SA | SP | DA | DP |
|---|---|---|---|---|
| TCP | 130.1.1.20 | 80 | 128.1.1.1 | 10,000 |

The NAT NAT-PT database 330 is searched for a match (step 506). Since the packet is from the Internet side of the router 306, in this example both NAT entries and NAT-PT entries are searched. This is because the packet could be going to either an IPv4 or IPv6 device. It is found that the entry in the NAT table, shown as Table 3, matches the packet (step 510). The entry in the NAT table is used to translate the packet (step 514) to:

| Protocol | SA | SP | DA | DP |
|---|---|---|---|---|
| TCP | 130.1.1.20 | 80 | 10.1.1.1 | 10,000 |

The packet is then sent to the first device 308 from the router 306 (step 518). If a match is not found, an error step may be done (step 522), such as dropping the packet.

User B

In another example, a TCP data packet is sent from user B at the second device to an IPv4 web server with an address 130.1.1.30 through the Internet 304. The packet may have the following protocol source address, source port, destination address, and destination port numbers:

| Protocol | SA | SP | DA | DP |
|---|---|---|---|---|
| TCP | 10.1.1.2 | 10,000 | 130.1.1.30 | 80 |

The router receives the packet (step 402). The router 306 searches the NAT NAT-PT database to see if such a connection already exists (step 406). Since the packet is from the private network and is in IPv4 format, only the NAT entries in the NAT table, shown as Table 3, part of the NAT NAT-PT database, are searched. Since a match is not found in the NAT NAT-PT database (step 410), the router 306 designates the packet as a new connection. The router 306 assigns a port number to the data packet.

The assignment of a port number not in use may first require a search for a protocol, address, and port combination that is not in use (step 422). This search searches both NAT and NAT-PT entries. This is to avoid conflicts with both IPv4 and IPv6 devices. In one embodiment of the invention, the router 306 may first try to use the port number designated by the packet. In another embodiment, the router 306 may assign a port number, ignoring the port number designate by the packet. In this example, an attempt to assign a port number of 10,000 for a TCP protocol for address 128.1.1.1 may first be performed either because it is the port number designated by the packet or as a default choice by the router. A search of the NAT NAT-PT database is made to see if any existing connections in the NAT NAT-PT database (if any NAT entries or any NAT-PT entries) use port 10,000 of the router 306 for a TCP connection for address 128.1.1.1. It is found that the NAT entry in the NAT table (Table 3) uses port 10,000 for a TCP connection for address 128.1.1.1. Another port is then designated and checked to see if it matches any existing connection. In this embodiment, the port number is incremented from 10,000 to 10,001 for a TCP connection for address 128.1.1.1. A search of the NAT NAT-PT database is made to see if any existing connections in the NAT NAT-PT database use port 10,001 of the router 306 for a TCP connection for address 128.1.1.1. It is found that the NAT-PT entry in NAT-PT table (Table 4) uses port 10,001 for a TCP connection for address 128.1.1.1. In this embodiment, the port number is incremented from 10,001 to 10,002. A search of the NAT NAT-PT database is made to see if any existing connections in the NAT NAT-PT database 330 use port 10,002 of the router 306 for a TCP connection for address 128.1.1.1. Since no such connection is found, the new connection is assigned the port number of 10,002 for a TCP protocol for address 128.1.1.1. An address, port, and protocol combination not in use has been successfully found.

The address, port, and protocol combination is placed in NAT NAT-PT database (step 426) by being placed in the NAT table, resulting in Table 5.

TABLE 5

| | Private | | | | Public | | | |
|---|---|---|---|---|---|---|---|---|
| Protocol | SA | SP | DA | DP | SA | SP | DA | DP |
| TCP | 10.1.1.1 | 10,000 | 130.1.1.20 | 80 | 128.1.1.1 | 10,000 | 130.1.1.20 | 80 |
| TCP | 10.1.1.2 | 10,000 | 130.1.1.30 | 80 | 128.1.1.1 | 10,002 | 130.1.1.30 | 80 |

The data packet is then translated, providing a new source address and source port, according to the entry in Table 5 (step 430), to yield:

| Protocol | SA | SP | DA | DP |
|---|---|---|---|---|
| TCP | 128.1.1.1 | 10,002 | 130.1.1.30 | 80 |

Then the packet is sent from the router 306 to the web server at the destination address (step 418).

The web server may then send a packet back to user B in reply. The packet sent from the web server to the router 306 may have address and port designations as follows:

| SA | SP | DA | DP |
|---|---|---|---|
| 130.1.1.30 | 80 | 128.1.1.1 | 10,002 |

The router 306 receives the packet (step 502). A search for a match in the NAT NAT-PT database is made (step 506). Both NAT entries and NAT-PT entries are searched in this example, since the packet is from the Internet and it is not known if the destination is an IPv4 or IPv6 device. It is found that the second NAT entry in the NAT table, shown as Table 5, matches the packet (step 510). Using Table 5, the router 306 translates the destination and source address and port of the packet (step 514) to:

| Protocol | SA | SP | DA | DP |
|---|---|---|---|---|
| TCP | 130.1.1.30 | 80 | 10.1.1.2 | 10,000 |

The packet is sent to the second device 309 (step 518).

User C

Now if user C at the third device 310 sends another data packet, the packet is received by the router 306 (step 402) with the following protocol, addresses, and ports:

| Protocol | SA | SP | DA | DP |
|---|---|---|---|---|
| TCP | 3000::1 | 10,001 | 5000::10 | 80 |

Since the destination of the packet is an IPv4 device with an IPv4 address of 130.1.2.10, the router 306 may need to assing an IPv6 address to it, so that the third device 310 may address the packets in an IPv6 format (e.g., in this example, an address of 5000::10 was previously assigned to the destination device).

A search is made of the NAT NAT-PT database for a match with the packet (step 406). Since it is known that the packet is in an IPv6 format, the search may only search through the NAT-PT entries in the NAT-PT part of the NAT NAT-PT database. A match is found with the NAT-PT entry in the NAT-PT database as shown in Table 4 (step 410). The packet is translated according to the match (step 414) to:

| SA | SP | DA | DP |
|---|---|---|---|
| 128.1.1.1 | 10,001 | 130.1.2.10 | 80 |

Then the packet is sent from the router 306 to the web server at the destination address (step 418).

The web server may then send a packet back to user C at the third device 310 in reply. The packet is sent from the web server and received by the router 306 (step 502). The packet may have the protocol, address, and port designations as follows:

| Protocol | SA | SP | DA | DP |
|---|---|---|---|---|
| TCP | 130.1.2.10 | 80 | 128.1.1.1 | 10,001 |

A search of the NAT NAT-PT database 330 is made to see if there is a match (step 506). Since the packet is from the Internet side of the router 306, a search of both the NAT entries and NAT-PT entries may be performed. It is found that the packet matches the entry in the NAT-PT table, shown in Table 4 (step 510). The packet is translated (step 514) to:

| Protocol | SA | SP | DA | DP |
|---|---|---|---|---|
| TCP | 5000::10 | 80 | 3000::1 | 10,001 |

The IPv6 packet is then sent to the third device 310 (step 518).

User D

In another example, a TCP data packet is sent from user D at the fourth device 311 to an IPv4 web server with an address 130.1.3.1 through the Internet 304. The packet may have the following protocol source address, source port, destination address, and destination port numbers.

| Protocol | SA | SP | DA | DP |
|---|---|---|---|---|
| TCP | 3000::2 | 10,000 | 5000::20 | 80 |

The router receives the packet (step 402). The router 306 searches the NAT NAT-PT database to see if such a connection already exists. Since the packet is in an IPv6 format, in this example only the NAT-PT entries in the NAT-PT table are searched to see if there is a matching entry to the source address, source port, destination address, destination port, and protocol combination (step 406). Since a match is not found in the NAT NAT-PT database (step 410), the router 306 designates the packet as a new connection. The router 306 assigns a port number to the data packet.

The assignment of a port number not in use may first require a search for a protocol, address, and port combination that is not in use (step 422). In one embodiment of the invention, the router 306 may first try to use the port number designated by the packet. In another embodiment, the router 306 may assign a port number, ignoring the port number designated by the packet. In this example, an attempt to assign a port number of 10,000 for a TCP protocol for address 128.1.1.1 may first be performed either because it is the port number designated by the packet or as a default choice by the router. A search of the NAT NAT-PT database is made to see if any existing connections in the NAT NAT-PT database use port 10,000 of the router 306 for a TCP connection for address 128.1.1.1. In this embodiment, both NAT entries and NAT-PT entries are searched to avoid port conflicts with both NAT and NAT-PT connections. It is found that a NAT entry in the NAT table (Table 5) uses port 10,000 for a TCP connection for address 128.1.1.1. Another port is then designated and checked to see if it matches any existing connections. In this embodiment, the port number is incremented from 10,000 to 10,001 for a TCP protocol for address 128.1.1.1. A search of the NAT NAT-PT database is made to see if any existing connections in the NAT NAT-PT database use port 10,001 of the router 306 for a TCP connection for address 128.1.1.1. It is found that the NAT-PT entry in NAT-PT table (Table 4) uses port 10,001 for a TCP connection for address 128.1.1.1. In this embodiment, the port number is incremented from 10,001 to 10,002. A search of the NAT NAT-PT database is made to see if any existing connections in the NAT NAT-PT database 330 use port 10,002 of the router 306 for a TCP connection for address 128.1.1.1. It is found that a NAT entry in the NAT table (Table 5) uses port 10,002 for a TCP connection for address 128.1.1.1. In this embodiment, the port number is incremented from 10,002 to 10,003. A search of the NAT NAT-PT database is made to see if any existing connections in the NAT NAT-PT database 330 use port 10,003 of the router 306 for a TCP connection for address 128.1.1.1. Since no such connection is found, the new connection is assigned the port number of 10,003 for a TCP protocol for address 128.1.1.1. An address, port, and protocol combination not in use has been successfully found.

The address, port, and protocol combination is placed in the NAT NAT-PT database (step 426) by being placed in the NAT-PT table, resulting in Table 6.

shown as Table 6, matches the packet (step 510). Using Table 6, the router 306 translates the protocol, destination and source address and port of the packet (step 514) to:

| Protocol | SA | SP | DA | DP |
|---|---|---|---|---|
| TCP | 130.1.3.1 | 80 | 3000::2 | 10,000 |

The packet is sent to the fourth device 311 (step 518).

In this embodiment, different protocols may be assigned the same port and address combinations. For example, a UDP message using port 10,000 for 128.1.1.1 would not be a match with the TCP connection using port 10,000 for 128.1.1.1, so that both sessions may run concurrently.

A single IPv4 address was used for the router 306 in this example to show that the inventive device is able to provide NAT and NAT-PT with PAT for a mixture of IPv4 and IPv6 devices using a single address. If multiple IPv4 addresses are used, once all the ports for one address are in use, an algorithm may search a next address for available ports. Other searching algorithms for available ports may be used. For example, ports on different addresses may be used so that different addresses may be used equally, in addition to or alternatively to using different ports.

The invention allows the sharing of IPv4 addresses to provide both NAT and NAT-PT with PAT, instead of requiring that NAT use different IPv4 addresses than NAT-PT. In addition, the invention allows a mixture of IPv4 and IPv6

TABLE 6

| | IPv6 | | | | IPv4 | | | |
|---|---|---|---|---|---|---|---|---|
| Protocol | SA | SP | DA | DP | SA | SP | DA | DP |
| TCP | 3000::1 | 10,001 | 5000::10 | 80 | 128.1.1.1 | 10,001 | 130.1.2.10 | 80 |
| TCP | 3000::2 | 10,000 | 5000::20 | 80 | 128.1.1.1 | 10,003 | 130.1.3.1 | 80 |

The data packet is then translated, providing a new source address and source port, according to the entry in Table 6 (step 430), to yield:

| Protocol | SA | SP | DA | DP |
|---|---|---|---|---|
| TCP | 128.1.1.1 | 10,003 | 130.1.3.1 | 80 |

Then the IPv4 packet is sent from the router 306 to the web server at the destination address (step 418).

The web server may then send a packet back to user D in reply. The packet sent from the web server to the router 306 may have address and port designations as follows:

| SA | SP | DA | DP |
|---|---|---|---|
| 130.1.3.1 | 80 | 128.1.1.1 | 10,003 |

The router 306 receives the packet (step 502). A search for a match in the NAT NAT-PT database is made (step 506). Since the packet is received from the Internet side of the router 306, a search of NAT entries and NAT-PT entries is made. It is found that the second entry in the NAT-PT table, devices to be connected to the inventive device without needing to know whether a particular device is an IPv4 or IPv6 device, instead of requiring that all IPv4 devices be connected to a NAT device and all IPv6 devices be connected to a separate NAT-PT device or requiring knowledge of the whether a device uses IPv4 or IPv6.

In other embodiments, the NAT NAT-PT database may be divided according to ports instead of whether the translation is NAT or NAT-PT. In other embodiments, the database may be separated in other ways, however, the overall NAT NAT-PT database has both NAT and NAT-PT entries.

The NAT-PT may also be used to accomplish other functions. An example of another function provided by the NAT-PT is described in U.S. patent application Ser. No. 09/920,533, filed Jul. 31, 2001, entitled, "MECHANISMS FOR AVOIDING PROBLEMS ASSOCIATED WITH NETWORK ADDRESS PROTOCOL TRANSLATION", by Daniel C. Biederman.

Generally, the techniques for providing NAT NAT-PT with PAT of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software, such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the packet processing system (e.g., NAT NAT-PT with PAT device) may be implemented on a general-purpose network host machine such as a personal computer or workstation.

Further, the invention may be at least partially implemented on a card (e.g., an interface card) for a network device or a general-purpose computing device.

Figure 6:
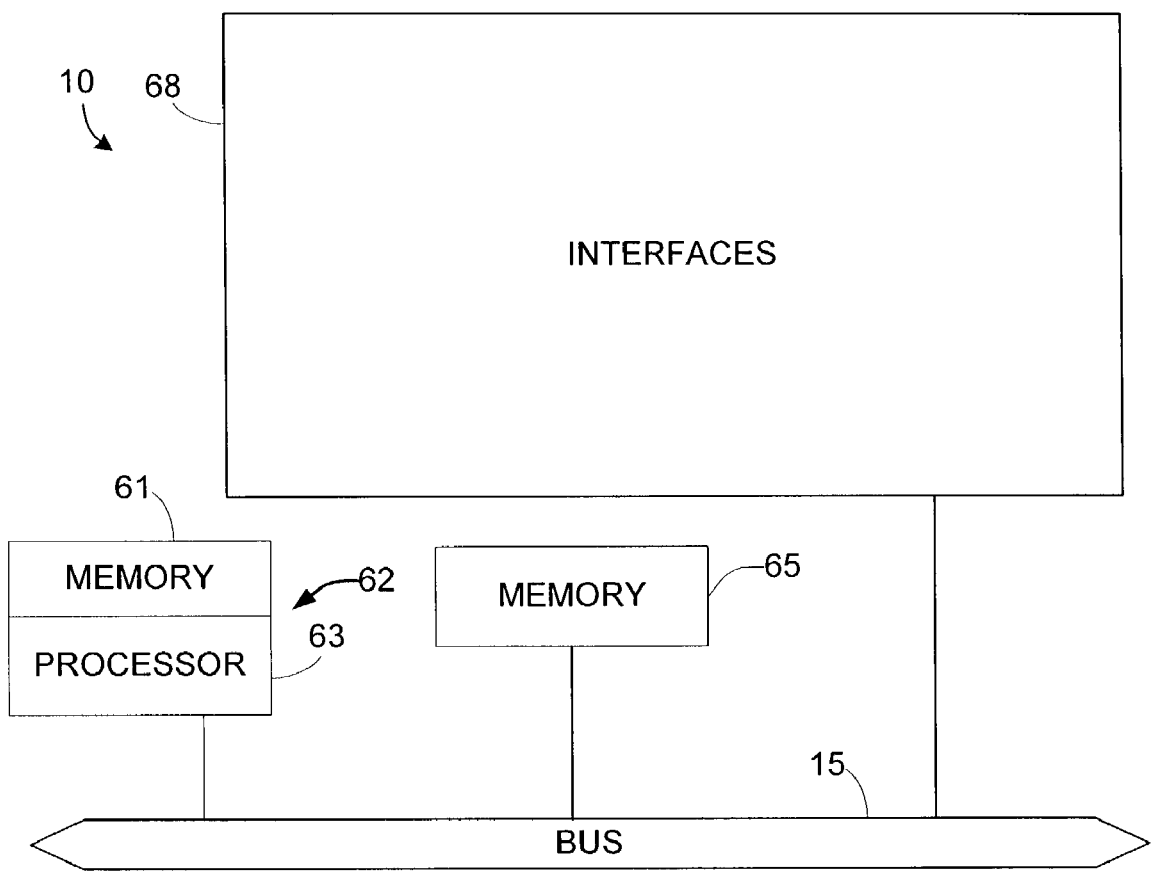
FIG. 6 is a diagrammatic representation of a router in which embodiments of the present invention may be implemented.

Referring now to FIG. 6, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for performing protocol conversions between a first and second protocol (e.g., IPv6 and IPv4), performing port translation and address translations, maintaining NAT -PT or NAT tables, etc. It preferably accomplishes all these functions under the control of software including an operating system (e.g., the Internetwork Operating System (IOS®) of Cisco Systems, Inc.) and any appropriate applications software. CPU 62 may include one or more processors 63, such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 62 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc., is often used. Further, other types of interfaces and media could also be used with the router.

Regardless of the network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store NAT and NAT-PT entries, received packets and identifiers to track each flow and the number of such flows, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory (ROM) and random access memory (RAM) devices. The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For example, the techniques of the present invention may be applied to other conversions besides IPv4 to IPv6 conversions. Therefore, the described embodiments should be taken as illustrative and not restrictive, and the invention should not be limited to the details given herein but should be defined by the following claims and their full scope of equivalents. There are alterations, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. A method performed by a network device coupled with a plurality of hosts, for transparently sharing at least one common IPv4 address among the plurality of hosts wherein at least a first host of the plurality of hosts uses the IPv4 protocol (IPv4 host) and wherein at least a second host of the plurality of hosts uses an IPv6 protocol (IPv6 host), the method comprising:
   receiving a packet from a host, the packet including first data having a first source address and a first destination address;

performing a network address translation with port address translation if the first data is in an IPv4 protocol; and performing a network address translation protocol translation with port address translation if the first data is in an IPv6 protocol, wherein the performing a network address translation with port address translation if the first data is in an IPv4 protocol and the performing a network address translation protocol translation with port address translation if the first data is in an IPv6 protocol share the at least one common IPv4 address and a plurality of port addresses so as to transparently assign the at least one common IPv4 address to either the IPv4 host or the IPv6 host.

2. The method, as recited in claim 1, wherein the performing a network address translation with port address translation if the first data is in an IPv4 protocol and the performing a network address translation protocol translation with port address translation if the first data is in an IPv6 protocol can share the at least one common IPv4 address, while providing port address translation.

3. The method, as recited in claim 2, further comprising forwarding the first data to an IPv4 service on an Internet.

4. The method, as recited in claim 3, wherein the performing a network address translation with port address translation searches a Network Address Translation and Network Address Translation—Protocol Translation (NAT NAT-PT) database, and wherein the performing a network address translation protocol translation with port address translation searches the NAT NAT-PT database.

5. The method, as recited in claim 3, wherein the performing the network address translation with port address translation, comprises:

searching at least part of an NAT NAT-PT database for a match with the first data; and translating the packet if a match to an entry in the NAT NAT-PT is found, wherein the packet is translated according to the found entry.

6. The method, as recited in claim 5, wherein the performing the network address translation protocol translation with port address translation, comprises:

searching at least part of the NAT NAT-PT database for a match with the first data; and translating the packet if a match to an entry in the NAT NAT-PT is found, wherein the packet is translated according to the found entry.

7. The method, as recited in claim 6, wherein the performing the network address translation with port address translation further comprises searching both network address translation entries and network address translation protocol translation entries for a protocol, address, and port combination not in use if a match with the first data not found.

8. The method, as recited in claim 3, wherein the performing the network address translation with port address translation comprises searching both network address translation entries and network address translation protocol translation entries for a protocol, address, and port combination not in use.

9. The method, as recited in claim 1, wherein the performing the network address translation with port address translation comprises:

searching at least part of a NAT NAT-PT database for a match with the first data; and searching both network address translation entries and network address translation protocol translation entries for a protocol, address, and port combination not in use.

10. A computer system implemented on a network device coupled with a plurality of hosts, operable for providing transparent sharing at least one common IPv4 address among a plurality of hosts wherein at least a first host of the plurality of hosts uses the IPv4 protocol (IPv4 host) and wherein at least a second host of the plurality of hosts uses an IPv6 protocol (IPv6 host), the computer system comprising:

one or more processors; and one or more memory, wherein at least one of the processors and memory are configured to:

receive a packet from a host, the packet including first data having a first source address and a first destination address;

perform a network address translation with port address translation if the first data is in an IPv4 protocol; and perform a network address translation protocol translation with port address translation if the first data is in an IPv6 protocols, wherein the network address translation with port address translation if the first data is in an IPv4 protocol and the network address translation protocol translation with port address translation if the first data is in an IPv6 protocol share the at least one common IPv4 address and a plurality of port addresses such that the one or more processors transparently assign the at least one common IPv4 address to either the IPv4 host or the IPv6 host.

11. The computer system, as recited in claim 10, wherein the processors and memory are further configured to forward the first data to an IPv4 service on an Internet, and wherein the performing a network address translation with port address translation if the first data is in an IPv4 protocol and the performing a network address translation protocol translation with port address translation if the first data is in an IPv6 protocol share the at least one common IPv4 address, while providing port address translation.

12. The computer system, as recited in claim 11, wherein the performing a network address translation with port address translation searches an NAT NAT-PT database, and wherein the performing a network address translation protocol translation with port translation searches the NAT NAT-PT database.

13. The computer system, as recited in claim 12, wherein the performing the network address translation with port address translation further comprises searching both network address translation entries and network address translation protocol translation entries for a protocol, address, and port combination not in use if a match with the first data is not found.

14. The computer system, as recited in claim 10, wherein the performing the network address translation with port address translation further comprises:

searching at least part of a NAT NAT-PT database for a match with the first data; and searching both network address translation entries and network address translation protocol translation entries for a protocol, address, and port combination not in use if a match with the first data is not found.

15. A computer program product for providing transparent sharing at least one common IPv4 address among a plurality of hosts connected to a network device, wherein at least a first host of the plurality of hosts uses the IPv4 protocol (IPv4 host) and wherein at least a second host of the plurality of hosts uses an IPv6 protocol (IPv6 host) said product comprising:

at least one computer readable medium;

computer program instructions stored within the at least one computer readable product for carrying out a method comprising:

receiving a packet from a host at the network device, the packet including first data having a first source address and a first destination address;

performing a network address translation with port address translation if the first data is in an IPv4 protocol; and performing a network address translation protocol translation with port address translation if the first data is in an IPv6 protocol, wherein the performing a network address translation with port address translation if the first data is in an IPv4 protocol and the performing a network address translation protocol translation with port address translation if the first data is in an IPv6 protocol share the at least one common IPv4 address and a plurality of port addresses, such that the at least one common IPv4 address is transparently assigned to either the IPv4 host or the IPv6 host.

16. The computer program product, as recited in claim 15, wherein the computer instructions are further configured to forward the first data to an IPv4 service on an Internet, and wherein the performing a network address translation with port address translation if the first data is in an IPv4 protocol and the performing a network address translation protocol translation with port address translation if the first data is in an IPv6 protocol share the at least one common IPv4 address, while providing port address translation.

17. The computer program product, as recited in claim 16, wherein the performing a network address translation with port address translation searches an NAT NAT-PT database, and wherein the performing a network address translation protocol translation with port address translation searches the NAT NAT-PT database.

18. The computer program product, as recited in claim 17, wherein the performing the network address translation with port address translation further comprises searching both network address translation entries and network address translation protocol translation entries for a protocol, address, and port combination not in use.

19. The computer program product, as recited in claim 15, wherein the performing the network address translation with port address translation further comprises:

searching at least part of a NAT NAT-PT database for a match with the first data; and searching both network address translation entries and network address translation protocol translation entries for a protocol, address, and port combination not in use.

20. An apparatus for providing transparent sharing at least one common IPv4 address among a plurality of hosts wherein at least a first host of the plurality of hosts uses the IPv4 protocol (IPv4 host) and wherein at least a second host of the plurality of hosts uses an IPv6 protocol (IPv6 host), the apparatus comprising:

a network device confirmed to couple with a plurality of hosts;

means for receiving a packet from a host, the packet including first data having a first source address and a first destination address;

means for performing a network address translation with port address translation if the first data is in an IPv4 protocol; and means for performing a network address translation protocol translation with port address translation if the first data is in an IPv6 protocols, wherein the means for performing a network address translation with port address translation if the first data is in an IPv4 protocol and the means for performing a network address translation protocol translation with port address translation if the first data is in an IPv6 protocol share the at least one common IPv4 address and a plurality of port addresses, such that the at least one common IPv4 address is transparently assigned to either the IPv4 host or the IPv6 host.

21. The apparatus, as recited in claim 20, further comprising means for forwarding the first data to an IPv4 service on an Internet, and wherein the means for performing a network address translation with port address translation if the first data is in an IPv4 protocol and the means for performing a network address translation protocol translation with port address translation if the first data is in an IPv6 protocol share the at least one common IPv4 address, while providing port address translation.

22. The apparatus, as recited in claim 21, wherein the means for performing a network address translation with port address translation comprises means for searching an NAT NAT-PT database, and wherein the means for performing a network address translation protocol translation with port address translation comprises means for searching the NAT NAT-PT database.

23. The apparatus, as recited in claim 22, wherein the means for performing the network address translation with port address translation further comprises means for searching both network address translation entries and network address translation protocol translation entries for a protocol, address, and port combination not in use.

24. The apparatus, as recited in claim 20, wherein the means for performing the network address translation with port address translation further comprises:

means for searching at least part of a NAT NAT-PT database for a match with the first data; and means for searching both network address translation entries and network address translation protocol translation entries for a protocol, address, and port combination not in use.

* * * * *